US00RE33935E

United States Patent [19]

Fujimoto et al.

[11] E Patent Number: Re. 33,935

[45] Reissued Date of Patent: May 26, 1992

[54] APPARATUS AND METHOD FOR FEEDING SINTERING RAW MIX

[76] Inventors: Masami Fujimoto; Tadahiro Inazumi; Katsuhiko Satoh, all c/o Nippon Steel Corporation, R & D Laboratories-III, 1-1-1, Edamitsu, Yahatahigashi-ku, Kitakyushu-shi, Fukuoka; Eiichi Shimozawa; Yasuhiko Awa; Fumihiro Sato; Kenro Nozaki, all c/o Nippon Steel Coroporation, Kimitsu Works 1, Kimitsu, Kimitsu-shi, Chiba; Akira Gushima; Yosinobu Suemura; Nobuo Kusakabe; Kunihiro Imada, all c/o Nippon Steel Coroporation, Yamata Works, 1-1-1, Edamitsu, Yahatahigashi-ku, Kitakyushu-shi, Fukuoka; Masatoshi Arichi, c/o Nippon Steel Corporation, 6-3 Otemachi 2-chime, Chiyoda-ku, Tokyo; Mitsunori Tanaka; Yoshinori Umezu; Tsuneo Ikeda, all c/o Nippon Steel Corporation, Yawata Works, 1-1-1, Edamitsu, Yahatahigashi-ku, Kitakyushu-shi, Fukuoka, all of Japan

[21] Appl. No.: 587,232

[22] Filed: Sep. 24, 1990

Related U.S. Patent Documents

Reissue of:

[64] Patent No.: 4,871,393
Issued: Oct. 3, 1989
Appl. No.: 178,341
Filed: Apr. 6, 1988

[30] Foreign Application Priority Data

| | | | |
|---|---|---|---|
| Apr. 6, 1987 | [JP] | Japan | 62-85543 |
| Jun. 8, 1987 | [JP] | Japan | 62-88240 |
| Jul. 31, 1987 | [JP] | Japan | 62-193451 |
| Jul. 31, 1987 | [JP] | Japan | 62-193452 |
| Sep. 10, 1987 | [JP] | Japan | 62-138862 |
| Oct. 1, 1987 | [JP] | Japan | 62-151492 |

[51] Int. Cl.[5] ..... C22B 1/20

[52] U.S. Cl. ..... 75/386; 75/755; 266/79; 266/178

[58] Field of Search ..... 266/178, 196, 180, 181, 266/90, 79, 44; 209/236, 240, 241, 257, 309, 369; 75/746, 751, 755, 386

[56] References Cited

U.S. PATENT DOCUMENTS

| | | | |
|---|---|---|---|
| 2,409,378 | 10/1946 | Morgan | 266/178 |
| 2,726,079 | 12/1955 | Sheets | 266/178 |
| 4,457,840 | 7/1984 | Nagi | 266/178 |
| 4,465,592 | 8/1984 | Nagi | 75/5 |

*Primary Examiner*—S. Kastler

[57] ABSTRACT

In an apparatus for feeding a sintering raw mix, a plurality of bars downwardly sloped in a falling direction of the sintering raw mix onto a pallet of a sintering apparatus is provided so that the falling direction of the raw mix is opposite to the advancing direction of the pallet, a screen is formed by rotatably supporting the bars, and the upper ends of the bars are connected to a rotating drive(s).

11 Claims, 16 Drawing Sheets

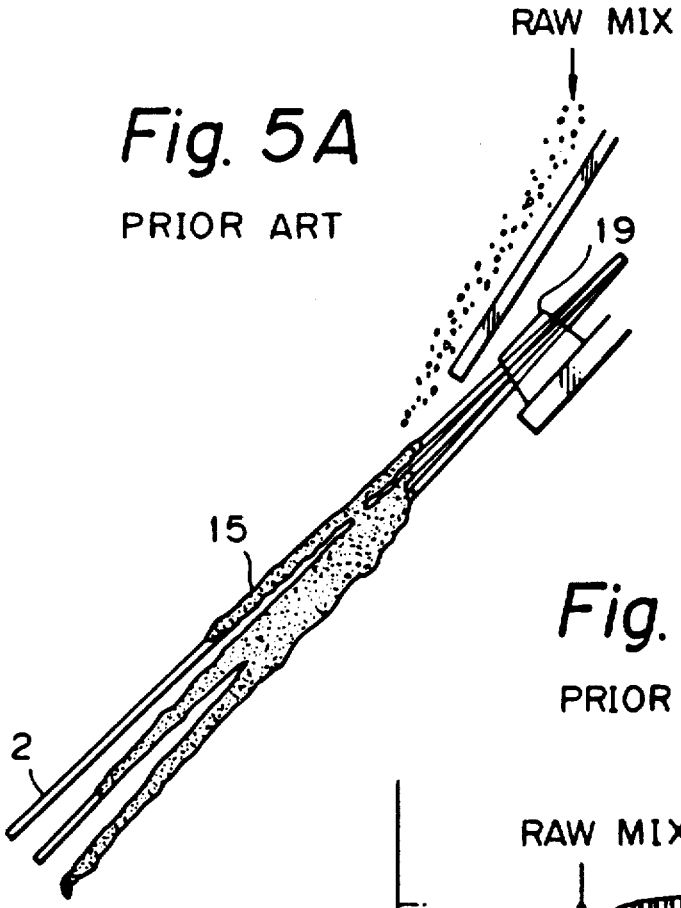
Fig. 5A
PRIOR ART
Fig. 5B
PRIOR ART
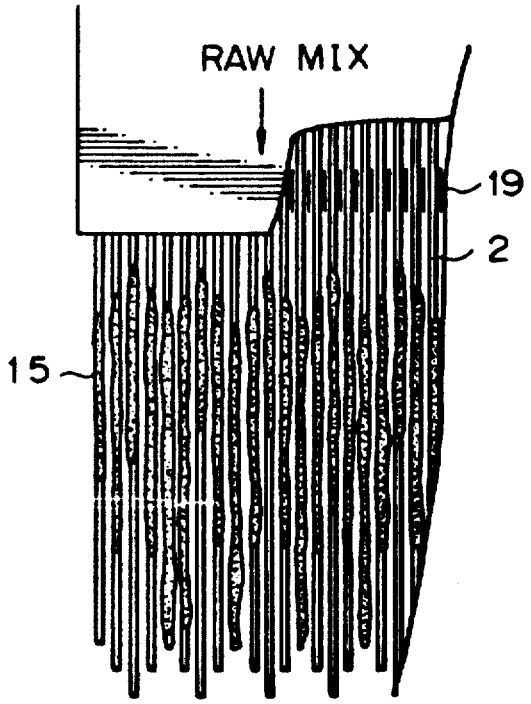

APPARATUS AND METHOD FOR FEEDING SINTERING RAW MIX

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an apparatus and a method for feeding a sintering raw mix, and more particularly, it relates to an apparatus and a method for feeding a sintering raw mix to produce a sintered ore for feeding into a blast furnace.

2. Description of the Related Art

Conventionally, in the iron and steel industry, when a sintering ore is fed into a blast furnace, a sintering apparatus uses coke breeze having a grain size suitable for an iron ore powder with a wide range of grain sizes of from a few μm to about 10 mm and an average diameter of 1 to 3 mm, and if necessary, burnt lime powders are mixed therewith, the mixture is fed onto a sintering pallet, the coke breeze in the surface raw mix layer is ignited to burn the coke while breathing air, and the fine ore is sintered by the burning heat.

Since, in this sintering apparatus, sintering is advanced by burning the coke breeze, the supply of air to the sintering layer, i.e., permeability, is very important for a sintering operation.

As a process for improving a permeability of a sintering raw mix layer, a pretreatment of a sintering raw mix itself (hereinafter referred to as a raw mix) is conventionally well known. In this pretreatment, various raw mixes to which a suitable amount of water has been added are mixed and granulated by a drum mixer so that large pseudo-particles having a larger grain size than the original grain size are produced. Further, in this pretreatment the addition of burnt lime to the raw mix to promote the production of pseudo-particles is also carried out. However, these improvements do not fully overcome the above-mentioned permeability problems.

On the other hand, when the above-mentioned pretreated raw mix is fed by a sloping chute which is usually provided at a sintering installation, a phenomenon occurs wherein the small size raw mix is stacked in the upper raw mix layer and the large size raw mix is stacked in the lower raw mix layer. Preferably, the pallet has percolation, i.e., a raw mix and coke grain size segregation occurs in the height direction of the raw mix layer, so that an improved heat pattern can be obtained. However, a slip phenomena often occurs when feeding the raw mix onto the pallet, and the above segregation is disturbed so that a part of both the fine ore and the coke breeze are mixed in the lower raw mix layer and a non-uniform structure with regard to grain size is formed. Consequently, an improved heat pattern cannot be obtained.

As a method for solving the above mentioned problem, a well known method of feeding a raw mix is disclosed in Japanese Unexamined Patent Publication (Kokai) No. 61-223136. This method, i.e., an intensified sifting and a grain-dispersion type feeding, is carried out, as shown in FIG. 1, by providing a number of bars or rods 2 about the pallet which forms a strand extending in a pallet advancing direction, in such a manner that the free ends of the bars are at different levels.

This feeding process will be explained in detail. First, a raw mix stored in a hopper 3 is fed rom a drum feeder 5 so that the raw mix falls on the bars 2 via a sloping plate 6. Since in this case the bars are sloped, and the pallet moves toward the free lower ends of the bars, so that the forward end of the pallet 1 receives the lower portion of the layer and the free end portions of the bars 2 are at different levels, the gaps between the bars are wider at the free ends. Thus, fine particles of the raw mix falling on the bars 2 fall through to the pallet 1 from ends toward the pallet, and coarse particles of the sintering raw mix fall through to the pallet 1 from the free ends of the bars 2, whereby a sift feeding to form a lower coarse particle layer and an upper fine particle layer on the pallet is carried out so that a grain size in the height direction of a raw mix layer can be optionally formed. Since, in this type of feeding, when the raw mix falls it is widely dispersed in the strand direction, the slip which occurs in the chute type is avoided, and the filling structure of the raw mix becomes uniform, and as a result, a uniform heat in the height direction of the bed can be realized. Further, in the feeding, by a sizing due to sifting and by the falling energy reduction due to collision with the bars during the falling of the raw mix, a low density feeding is carried out, and thus a high permeability can be obtained. However, since water is contained in a raw mix which is fed into a sintering apparatus to produce pseudo-particles from a fine raw mix, the raw mix will easily adhere to the bars, and when a burnt lime is used in the raw mix, the degree of adherence becomes large.

Further, since the gaps between the bars 2 are 5 to 30 mm, which is very small, when the sintering raw mix adheres to the bars 2, the gap between the bars 2 is narrowed, and thus the sifting and the grain-dispersion of the raw mix are not efficiently carried out. When the adhered layer on the bars 2 becomes too thick, the bars 2 cease to function as a screen. Further, since the sintering raw mix falling from the sloping plate impinges constantly upon the same portions of the bars 2, local wear is generated on the bars 2.

Thus, conventionally, the operation of the sintering apparatus must be periodically stopped to remove the adhered raw mix and replace worn bars 2. However, since this removal and replacement must be carried out in a narrow space, it is very cumbersome, and undue wastage of the bars 2 occurs because the entire body of each bar 2 is discarded although there is local wear on only portions thereof.

Japanese Examined Patent Publication (Kokoku) filed on Oct. 31, 1966) discloses a screen apparatus for sifting particles, in which a number of bars are arranged so that two adjoining bars have a different slope, and particles are sifted by oscillating these bars. Even in such a process, wherein particles are sifted while oscillating the bars, although a slight improvement is attained due to a difference in the oscillating frequency, the adhesion of particles to the bars cannot be completely eliminated.

Further, two Japanese Utility Model applications (Nos. 62-18098 and 62-29249) concerning an apparatus for removing adhered particles to bars, were filed on Jan. 10, 1987. The apparatus of JUM-098 as shown in FIG. 2 is constructed in such a manner that counterweights 9a and 9b arranged at the bar base end portion are struck by a hammer 12 having a hammer lever 10 and an oscillating arm 11, so that an impact force is given to bars 2, to separate and remove particles adhered to the bars 2. In FIG. 2 14a and 14b are cylinders.

However, in the process using the apparatus of JUM-098, the adhered particles are only substantially, not completely, removed. After a short time, e.g., about 10 sec, the usual adhered state is again encountered. This state is shown in FIG. 3A (side view) and FIG. 3B (plane view). From FIGS. 3A and 3B, it can be seen that a large amount of the sintering raw mix 15 is adhered to the bars 2.

The apparatus of JUM-249, as shown in FIG. 4, is constructed in such a manner that, by reciprocating a cleaner 19 formed by scrapers 17 and chips 18, a sintering raw mix adhered to bars is removed. In FIG. 4, 20 is a carriage for carrying the cleaner 19, which is moved along a guide rail 21, and 14a and 14b are cylinders.

In the process of JUM-249, the raw mix adhered to the bars is substantially removed, as in the process disclosed in JUM-098, but if the gaps between the bars are filled by the raw mix for only about ten sec, the usual adhered state is again encountered. This state is shown in FIG. 5A (side view) and FIG. 5B (plan view). As shown in FIGS. 5A and 5B the amount of raw mix 15 adhered to the bar 2 is high, as in the case where the adhered raw mix is not removed by the above-mentioned cleaners.

SUMMARY OF THE INVENTION

An object of the present invention is to provide an apparatus for feeding a sintering raw mix wherein adhesion of a sintering raw mix to the bars and wear of the bars is prevented.

Another object of the present invention is to provide a method for feeding a sintering raw mix wherein, in accordance with a change of a raw mix condition such as a grain size and a change of a production conduction such as a production rate, a feeding condition is controlled to carry out a long term stable operation.

A further object of the present invention is to provide a uniform sintering method in a pallet width direction by suppressing overbreathing at the side of the pallet.

According to the present invention, there is provided an apparatus for feeding a sintering raw mix, wherein a plurality of bars downwardly sloped in a falling direction of the sintering raw mix onto a pallet of a sintering apparatus is provided so that the falling direction of the raw mix is opposite to the advancing direction of the pallet, and a screen is formed by rotatably supported bars and the upper ends of the bars are connected to a rotating drive(s).

According to the present invention there is further provided a method for feeding a sintering raw mix, from a chute onto a pallet through bars acting as a screen wherein the bars are rotated, at least one of a feeding density permeability of a sintering raw mix layer fed on the pallet is detected and in accordance with the detected value at least one of control means consisting of the downward slope angles of the chute and the screen, a sliding distance of the chute, and a gap between the screen and the sintering raw mix layer is changed to control the permeability of the sintering raw mix fed onto the pallet due to an intensified sifting and grain-dispersion.

BRIEF DESCRIPTION OF THE DRAWINGS

FIGS. 5A and 5B are respectively a side view and a plan view illustrating the adhesion of raw mix to the bars in the apparatus shown in FIG. 4;

DESCRIPTION OF THE PREFERRED EMBODIMENTS

The embodiments of the present invention will now be explained with reference to the drawings.

Figure 1:
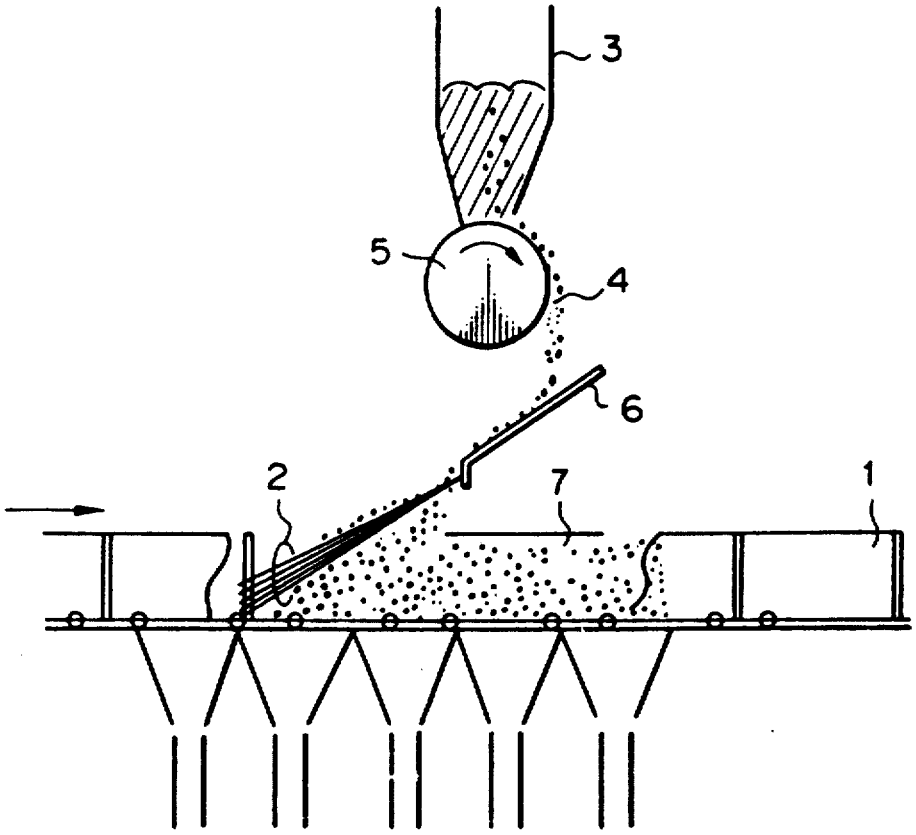
Fig. 1 PRIOR ART
FIG. 1 is a schematic elevation of a conventional apparatus for charging sintering raw mix.
Figure 2:
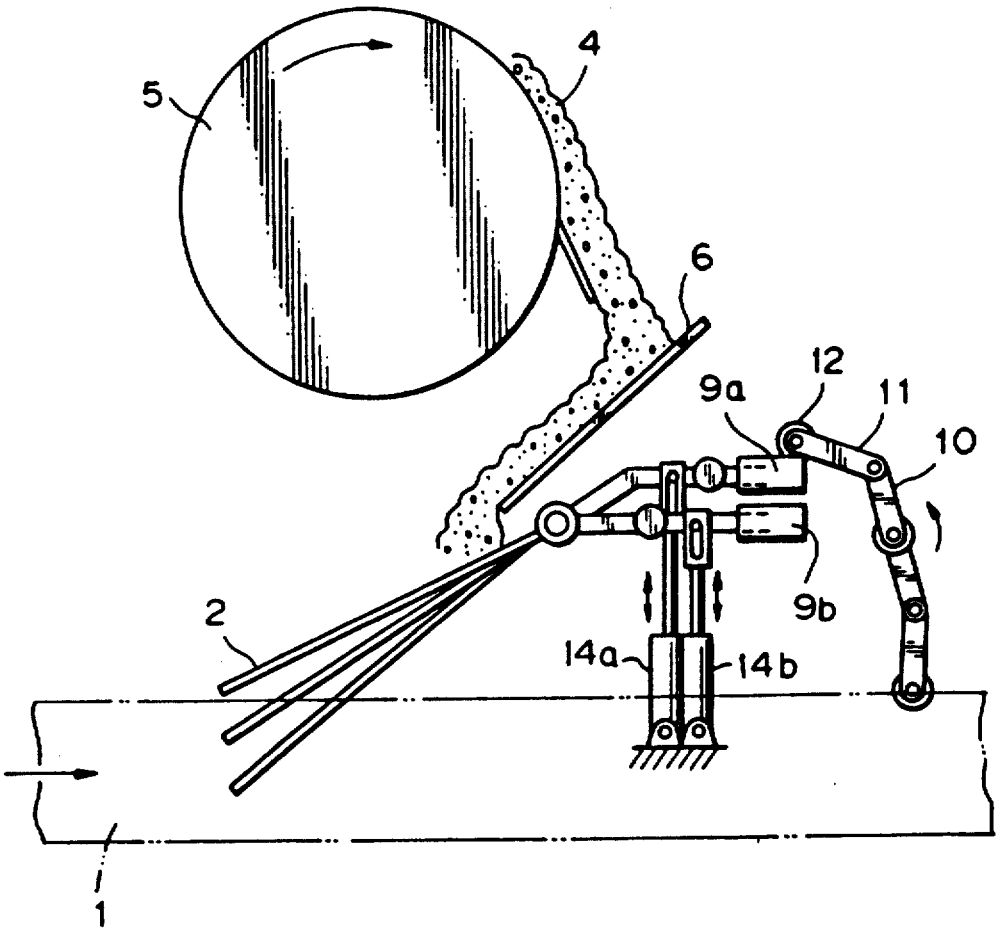
Fig. 2 PRIOR ART
FIG. 2 is a schematic elevation of a conventional apparatus having a hammer which strikes bars so that adhered raw mix is removed.
Figure 3A:
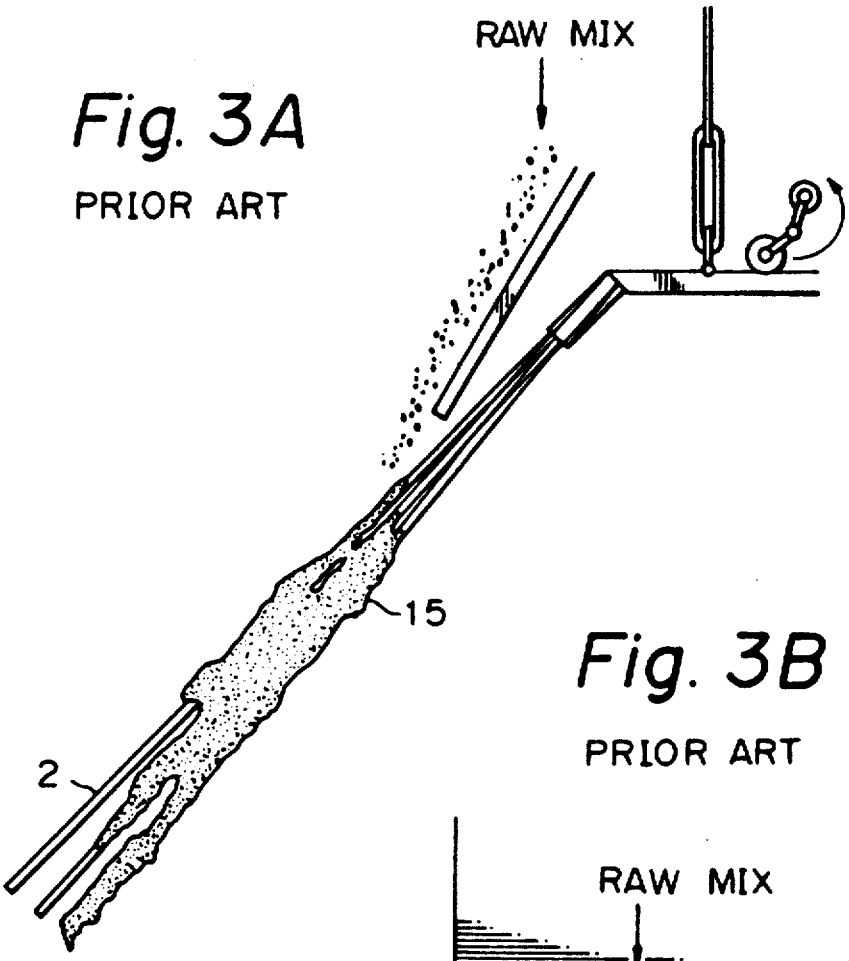
Fig. 3A PRIOR ART
FIGS. 3A and 3B are respectively a side view and a plan view illustrating a usual adhesion of raw mix to the bars in the apparatus shown in FIG. 2.
Figure 3B:
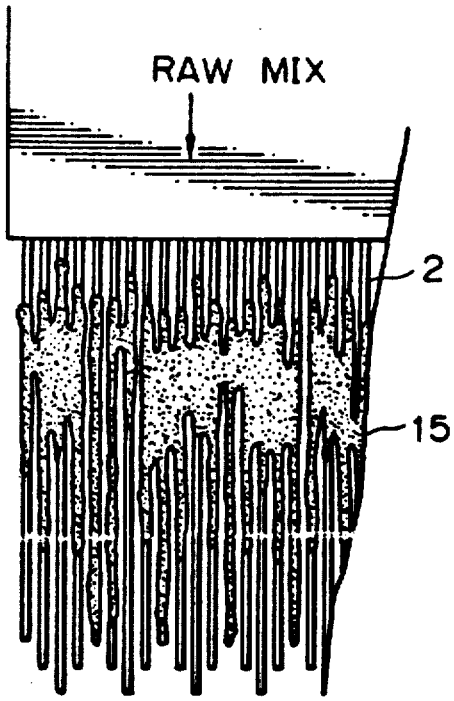
Fig. 3B PRIOR ART
Figure 4:
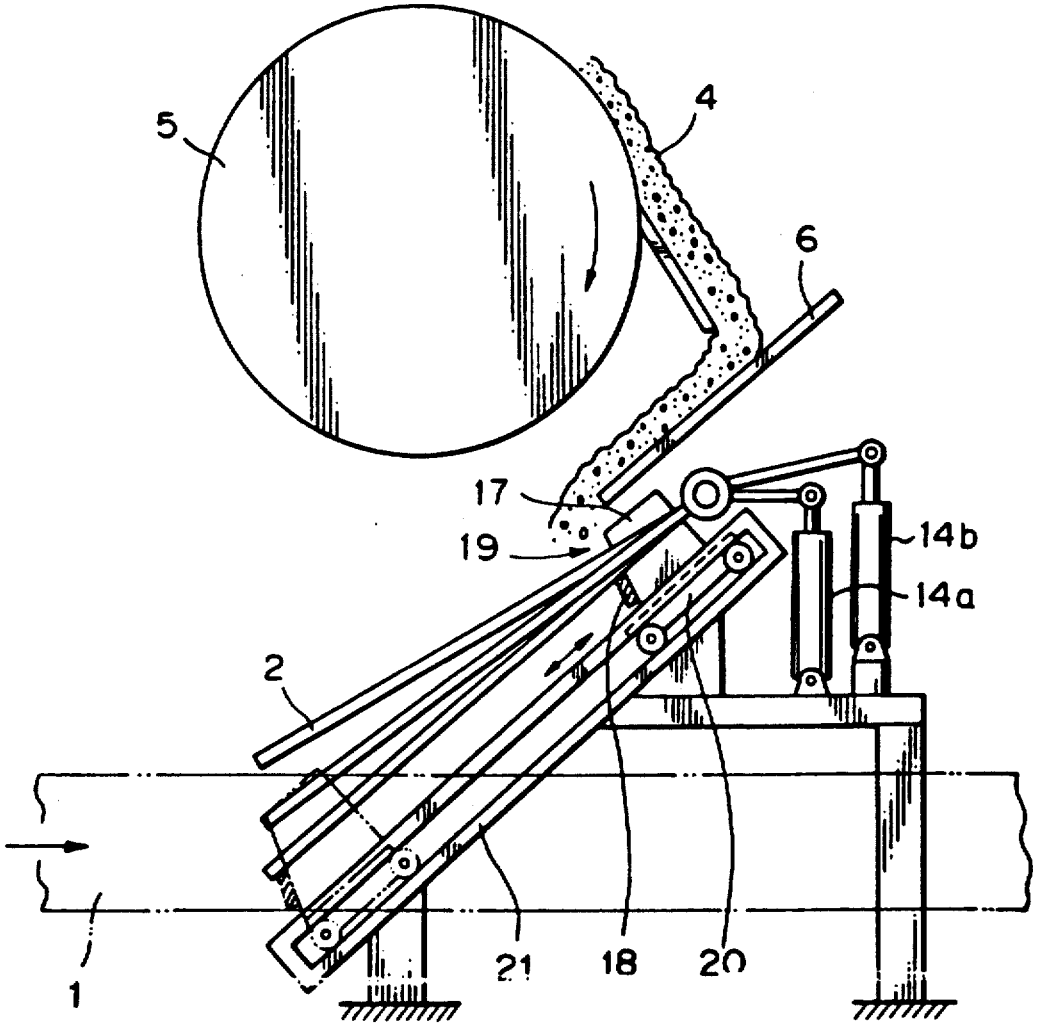
Fig. 4 PRIOR ART
FIG. 4 is a schematic elevation of a conventional apparatus having a cleaner formed by scrapers and chips.
Figure 6:
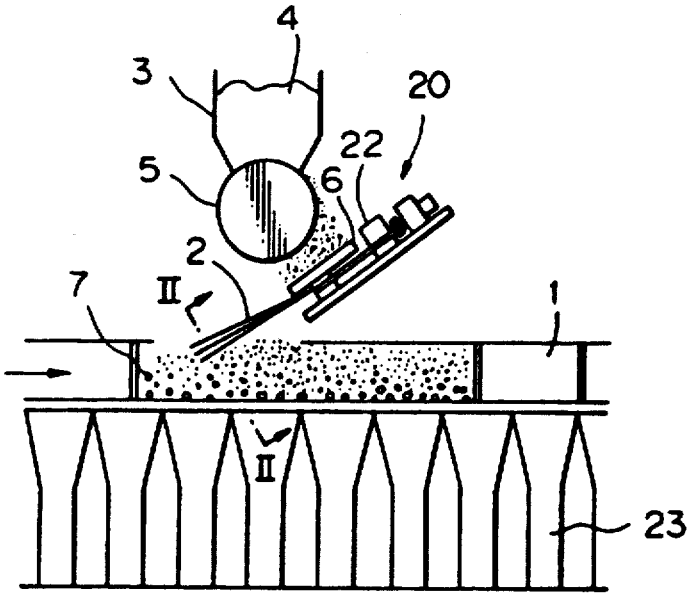
FIG. 6 is a schematic elevation view illustrating an arrangement of an apparatus for feeding a sintering raw mix according to the present invention.

FIG. 6 shows an arrangement of an apparatus for feeding a raw mix according to the present invention. As shown in FIG. 6, the feeding device 20 of the present invention is arranged below a drum feeder 5 and raw mix from a hopper 3 is introduced therein. A raw mix layer 7 formed through the feeding device 20 is formed into sintered ore by sucking air by a wind box 23.

The feeding device 20 is constructed by a plurality of bars 2, which are used as a screen to form a predetermined segregation state, divisionally and downwardly provided in the strand direction of the running pallet 1 and as driving gear 22. The bars can be round or rectangular, and can be solid or hollow.

Figure 7:
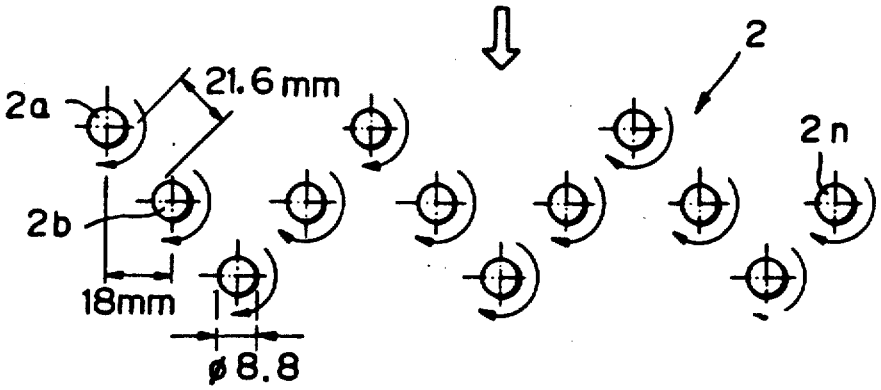
FIG. 7 is an end view illustrating an arrangement near the free end portions of the bars, taken along line II—II in FIG. 6.

FIG. 7 i a side view illustrating an arrangement near the free end (edge) portion of the bars 2, taken along line II—II in FIG. 6.

The bars 2a, 2b . . . 2n are made of bar steel having diameters of 5 to 10 mm, respectively, the serratedly divided by gaps of 5 to 30 mm between the bars, so that the width of the row of bars substantially corresponds to the width of the pallet. The adjacent bars diverge in the downward direction. The bars are rotated by a drive, as shown by an arrow. The rotation is not always the same, e.g., a continuous rotation, an intermittent rotation and a reversed rotation, can be carried out.

Figure 8:
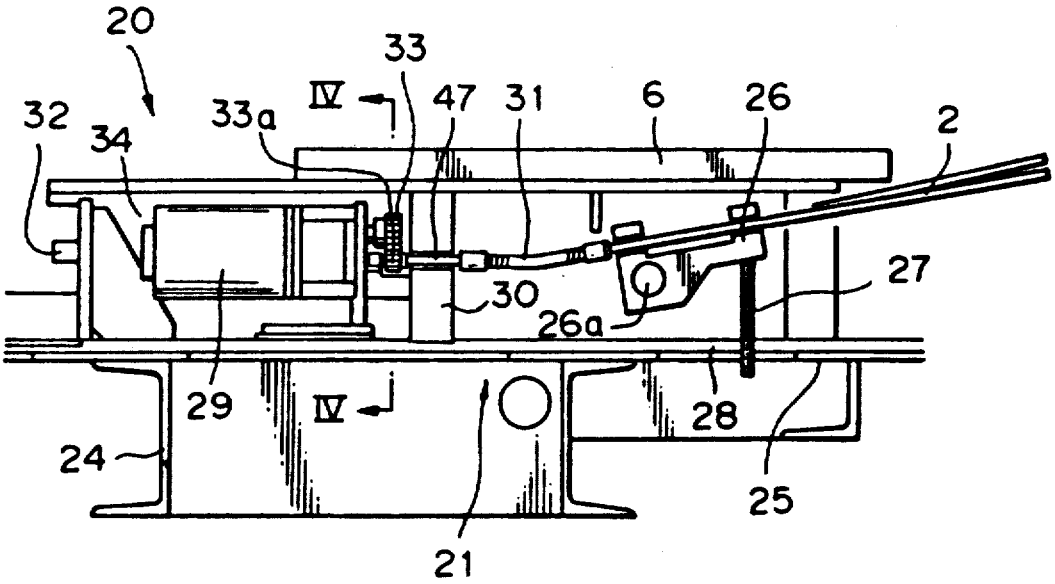
FIG. 8 is a view illustrating a connecting mechanism between a bar and a rotating drive, and the rotating drive mechanism.
Figure 9:
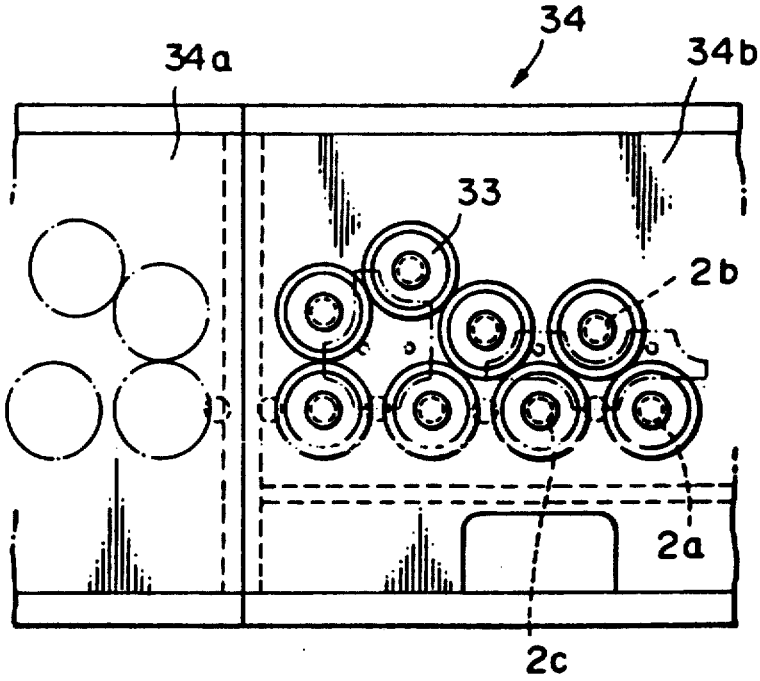
FIG. 9 is a cross-sectional view taken along the line IV—IV of FIG. 8.

The feeding device 20 will now be explained in detail with reference to FIGS. 8 and 9.

The feeding device 20 is formed by a rotating driving device formed as gear boxes 34 provided on a base 24, rotating axles 47, flexible joints 31, bars 2 and a frame 26 rotatably supporting the bars 2.

Figure 10:
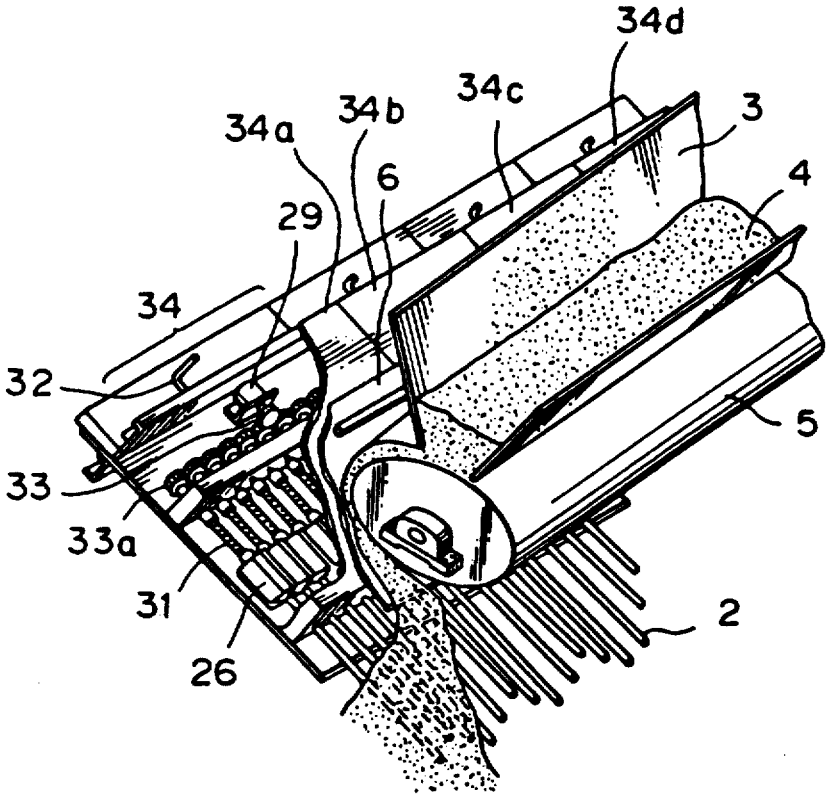
FIG. 10 is a perspective view illustrating the inner structure of the drive mechanism of the movable rotating drive.

In the gear boxes 34 are provided a motor 29, a driving gear 33 provided for the motor 29, and a plurality of follower gears 33a. Each follower gear 33a may be arranged close to another as shown in FIG. 9, or in parallel as shown in FIG. 10. The follower gears 33a are provided in the gear box 34 having a limited space and an axle 47 is connected to each follower gear 33a and rotatably supported by a wall 30 forming a gear box 34. The axle 47 and bar 2 are connected by a flexible joint 31, and bar 2 is rotatably supported by the frame 26.

The frame 26 is rotatably supported on a base 24 by a fixed axle 26a, and further connected to a screw shaft 27 supported by the base 24.

Thus, when the screw shaft 27 is rotated, the frame 26 is inclined with the axle 26a acting as a support thereof, and thus the slope angle of the bar 2 acting as a screen to a chute is controlled, and the gaps between bars are also controlled. Therefore the sifting and the grain-dispersion are varied.

As explained above, the axle 47 is connected to the bars 2 by the flexible joint 31, and the arrangement of the follower gear 33a is optionally designed. Further, the inclination angle of the bar 2 is also optionally set, with the result that the axes of the axle 47 and the bar 2 intersect, and thus the flexible joint 31 can transmit a rotative power thereto. The gear box 34 can be closed, and only the axle 47 acts as a rotating portion.

A purging gas inlet 32 is provided and purging gas, for example, air, is introduced into the gear box 34 and pressurized so that dust intrusion into the gear box 34 is prevented and a long term operation is smoothly carried out. A sloping chute 6 is provided above the gear box 34.

FIG. 10 is a perspective view of the raw mix feeding device 20.

As shown in FIG. 10, a raw mix 4 contained in a hopper 3 is fed by a drum feeder 5 and falls onto a sloping chute 6. The raw mix sliding on the sloping chute 6 is sifted by a screen formed by the bars 2 and thus is dispersedly fed onto a pallet. The bars 2 are connected to respective gear boxes 34a, 34b, 34c, and 34d. In the gear boxes 34 are provided a motor 29 driving gear 33, a plurality of follower gears 33a, a flexible joint 31, a frame 26, and a purge gas tube 32.

Figure 11:
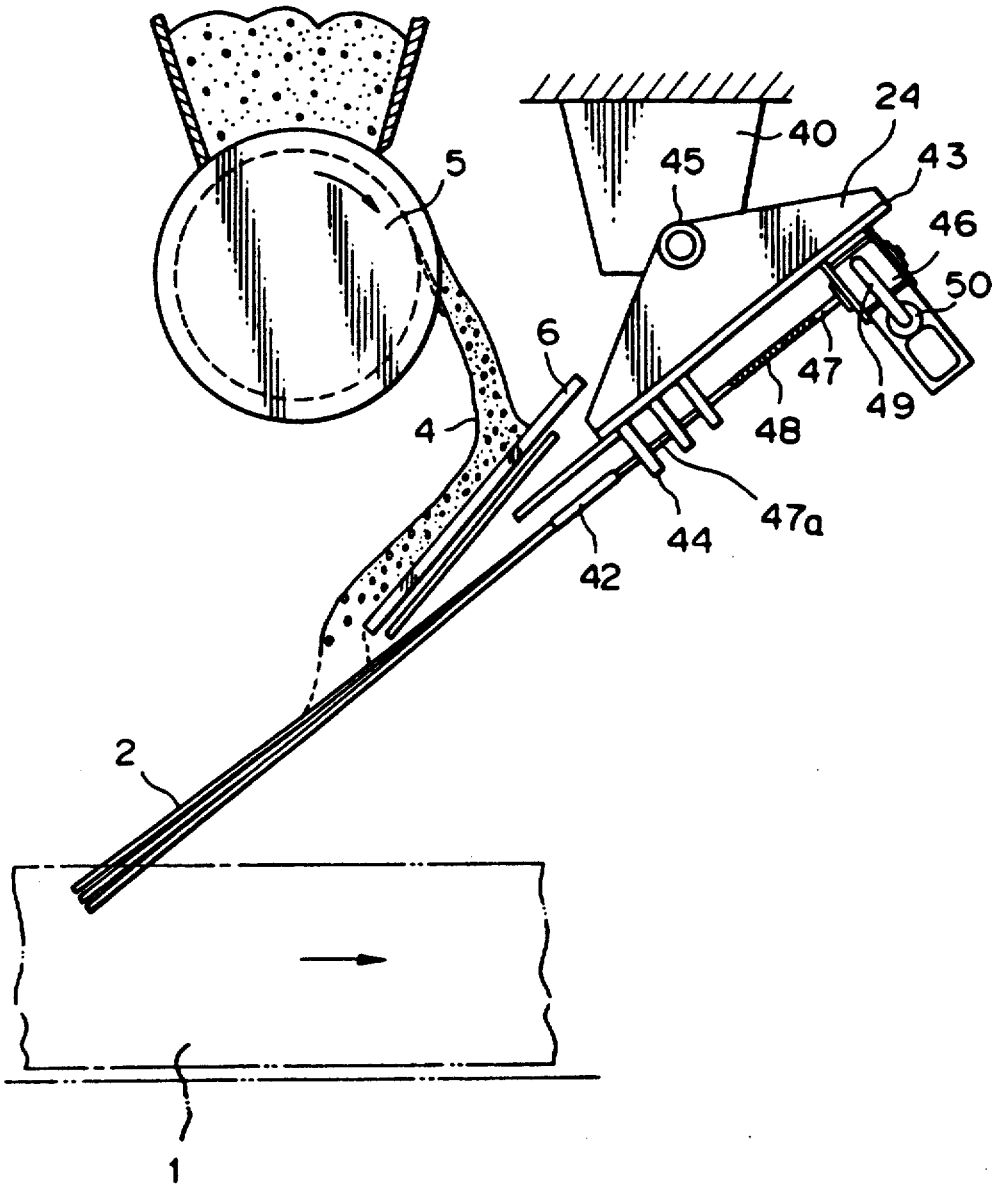
FIG. 11 is a side view of a main portion of a raw mix charging device of another sintering apparatus according to the present invention.
Figure 12:
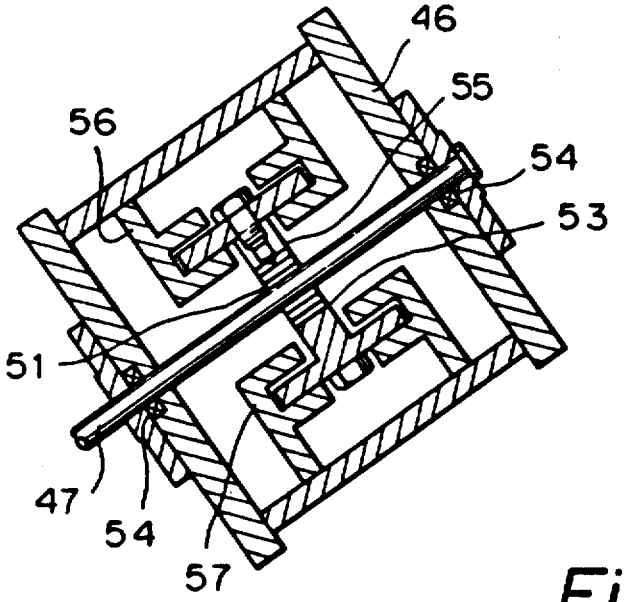
FIG. 12 is a side cross sectional view of a gear box of a bar rotating mechanism.
Figure 13:
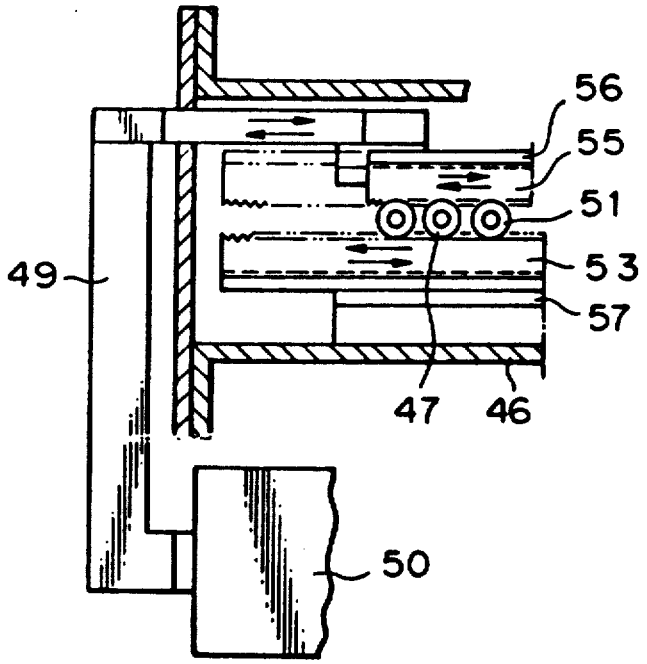
FIG. 13 is a front view illustrating an inner portion of a drive and a bar rotating mechanism.
Figure 14:
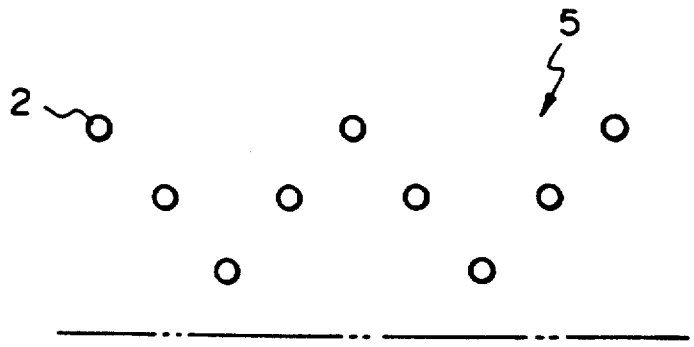
FIG. 14 is a view illustrating the free end portions of bars serratedly arranged.

FIG. 11 is a side view of a main portion of a raw mix feeding device of another sintering apparatus according to the present invention; FIG. 12 is a side cross sectional view of a gear box of a bar rotating mechanism; and FIG. 13 is a front view illustrating an inner portion of a drive and a bar rotating mechanism.

In the raw mix feeding device 20, the base 24 is pivotably mounted on the frame 40 through the axle 45. The angle of the bars with respect to the sloping chute 6 is determined by the angle at which the base 24 is arranged with respect to the frame 40. The base 24 comprises a gear box 46, a flexible pedestal 43, a rotary axle 47a, and a chuck 42 for holding the bar.

The rotary axle 47a is rotatably supported by a bearing 44.

Each downward bar angle is determined by a setting angle of the rotary axle 47a. Namely, the angle of each downward bar can be controlled by adjusting the height of the bearing 44 provided on the base 24.

Chucks 42 supporting the bars 2 are arranged at a rotatably movable pedestal 43. The angle of the pedestal 43 and each bearing 44 is controlled so that free end portions of the plurality of bars 2 form a serrated shape. The bars are arranged so that gaps between the bars are larger at the free ends, to sift the raw mix.

At the base end portion of the bars 2, a gear box 46 by which rotating axles 47 are rotated is fixed to the pedestal 43.

Upper end portions of the bars 2 are connected to lower end portions of the rotating axles 47 by flexible joints 48 which transmit rotational power thereto. The angles of slope of the rotating axles are entirely the same.

Each rotating axle 47 is supported so that it can be rotated in a rotating bearing 54 of the gear box 46. A pinion gear 51 is fixed to the rotating axle 47, and the pinion gear 51 is interposed between a non-driving rack 53, which is slidably movable in a lower guide 57, and a driving rack 55 which is slidably movable in a guide 56. Further, the end portion of the driving rack is connected to a cylinder 50 through a lever 49.

In order to rotate the bars 2 in this operation, first the cylinder 50 is driven, the reciprocating motion of the cylinder 50 becomes a rotating motion of the pinion gears 51, and although not shown, each bar can be driven by direct connection to a driving motor, instead of through the follower gears.

An exchange apparatus for the raw mix feeding apparatus according to the present invention will now be explained.

The above-mentioned gear box 34 can have the same width as that of the pallet 1 and form a feeding device as a monolithic type structure.

Further, the width of the gear box 34 can form a width of 1/n of the width of the pallet 1 and n gear boxes 34 can be provided in parallel to form the feeding device 20.

If the feeding device is the former type, the gear boxes can be exchanged as one unit, but if the feeding device is the latter type, the gear boxes 34 can be independently exchanged.

Figure 15:
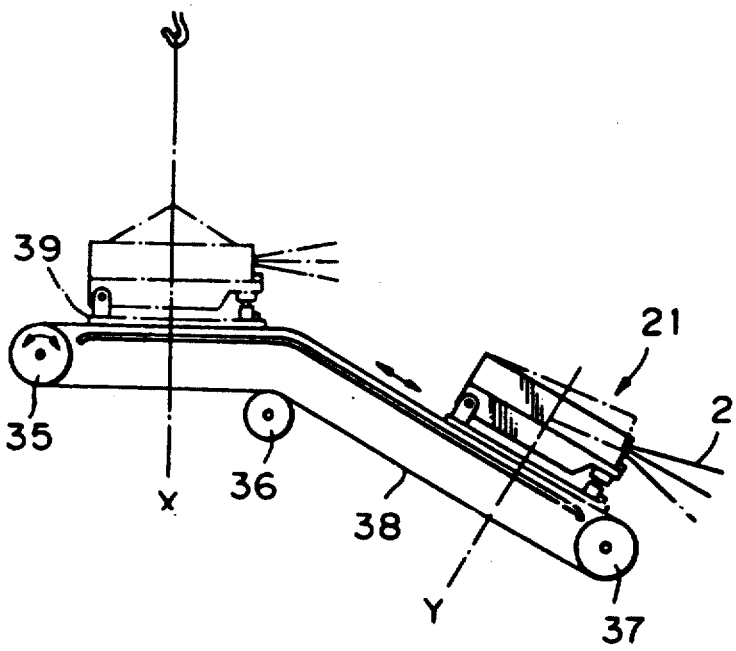
FIG. 15 is a view illustrating an example of movable rotating drive.

FIG. 15 is a view illustrating an example of the movable rotating drive. The rotating drive has a structure wherein the device is fixed to a carriage 39 provided on a belt 38 moving over pulleys 35, 36, and 37, so that the rotating drive is optionally moved between an exchange position X and an operating position Y by the movement of the belt 38.

The exchange apparatus according to the present invention has a sloped cradle supporting a raw mix feeding device having a chute slopedly arranged between a drum feeder and a pallet, a pivoted beam provided in a manner such that the beam can be connected to the sloped cradle, a crane for lifting the raw mix charging device along the pivoted beam, and a guide roller which defines a moving locus of the raw mix feeding device during the lifting.

The exchange apparatus will be concretely explained with reference to FIGS. 16 to 18.

Figure 16:
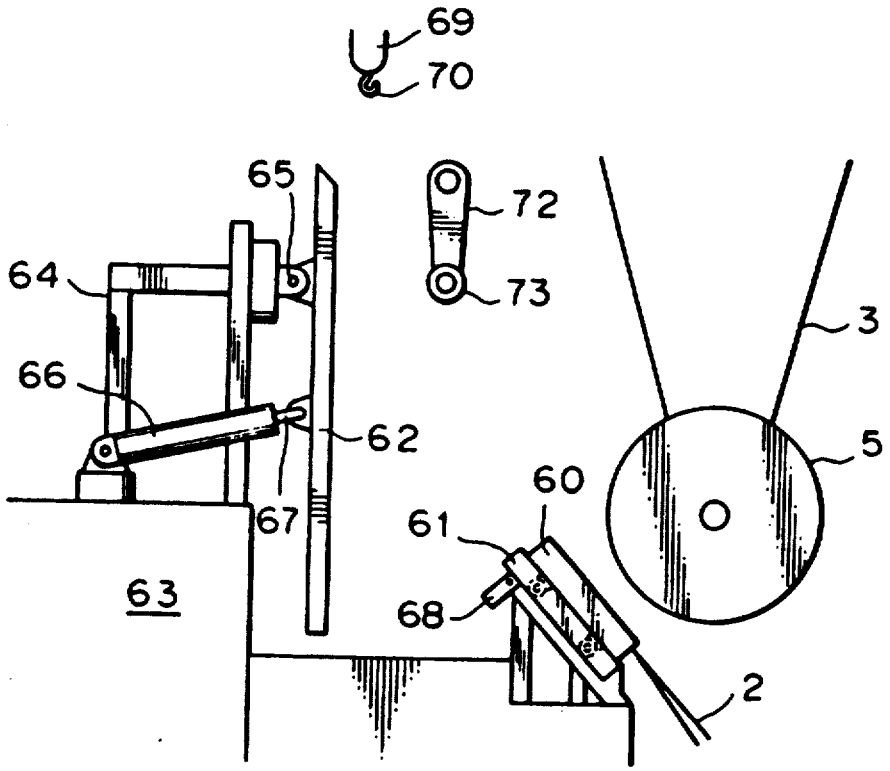
FIGS. 16 to 18 are side elevation views explaining a bar exchange device.

FIG. 16 is a view illustrating an exchange apparatus for a sintering raw mix feeding machine.

As shown in FIG. 16, a sloped cradle 61 which is held at a constant angle of slope to the machine 60 is provided under a raw mix feeding machine 60. The lower end of the machine 60 is fixed by a lower end arrangement sheet or may be free.

In the exchange apparatus, a guide beam 62, which is movable to form an upwardly extending extension of the sloped cradle 61, is provided. The guide beam 62 is pivotably provided on an axle 65 on a pillar provided on an ignition furnace used as a base 63, and a cylinder 66 is used to pivot the guide beam 62.

A lock member 68 is provided at the top end portion of the sloped cradle 61. This lock member 68 acts when the guide beam 62 is pivoted to the cradle 61.

Further, above the guide beam 62, a device for drawing out a feeding machine 60, for example, a crane, is provided. Note, 73 is a guide roller. This guide roller 73 is used when the feeding machine 60 is drawn out while moving along the guide beam 62.

Figure 17A:
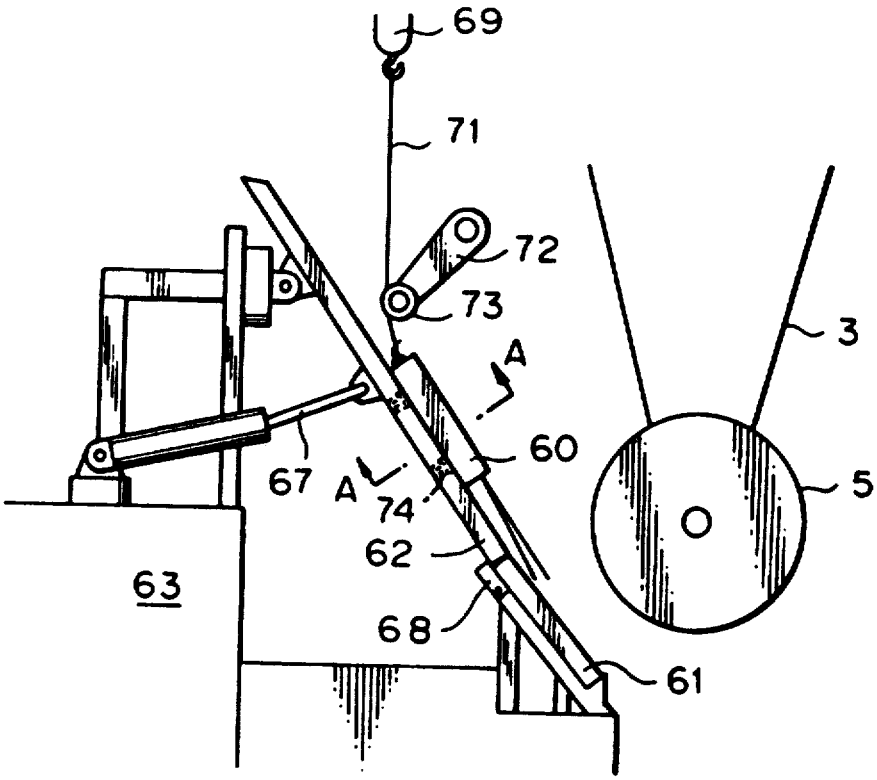
Figure 18:
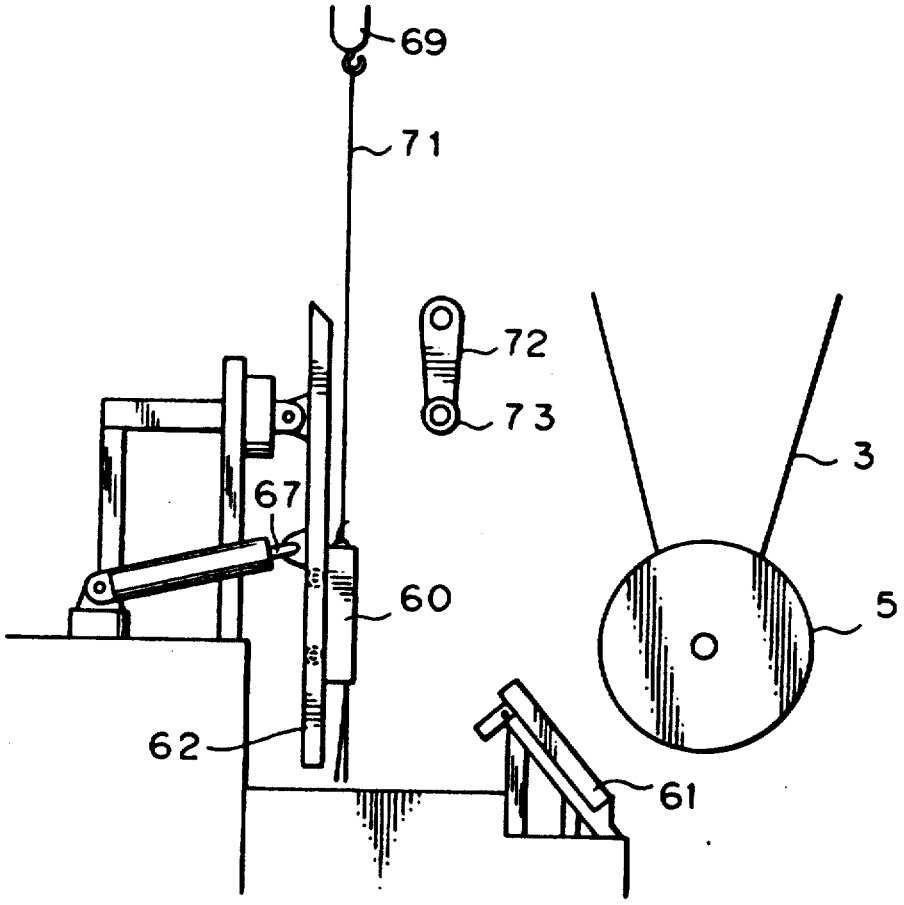

FIG. 17A is a view illustrating an example wherein a feeding machine is drawn out.

Figure 17B:
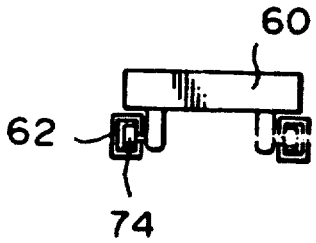

FIG. 17B is a cross sectional view taken along line AA of FIG. 17A. When the feeding machine 60 is drawn out from the cradle 61, it is lifted up as shown in FIG. 18.

On the other hand, a feeding machine 60, which has been already prepared, is lifted by the crane 69 and set on the cradle 61 by a reverse operation to the above method.

Figure 19A:
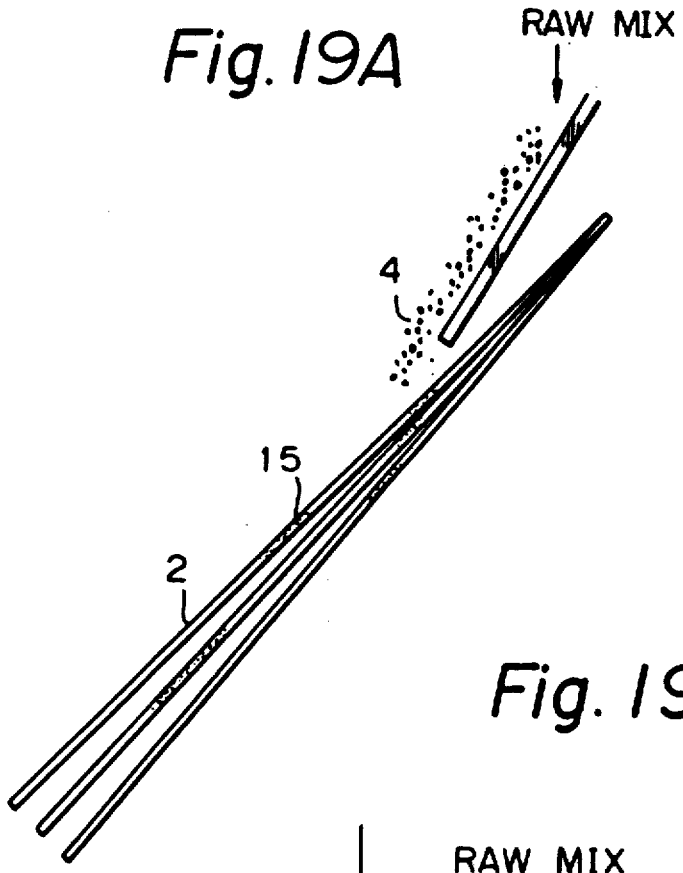
FIGS. 19A and 19B are respectively a side view and a plan view illustrating adhesion of raw mix to the bars by the apparatus shown in FIGS. 6 and 11.
Figure 19B:
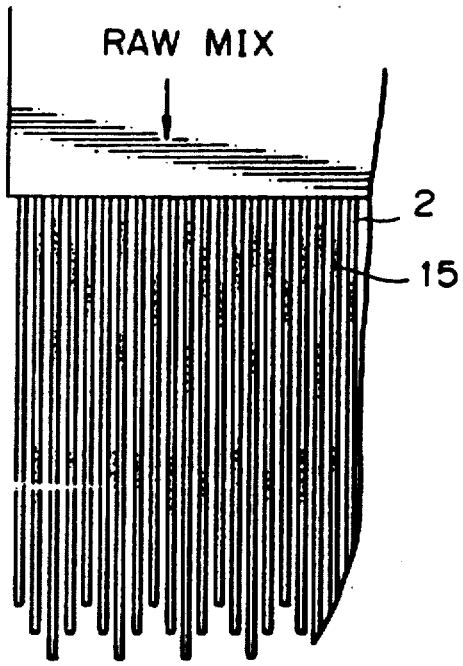

FIGS. 19A and 19B are, respectively, a side view and a plan view illustrating the adhesion of raw mix to the bars in the above example. Although the raw mix is adhered to the small areas on which it impinges, as shown in FIGS. 19A and 19B, the raw mix does not adhere to other areas of the bars.

The method of the present invention will now be explained in detail.

Figure 20:
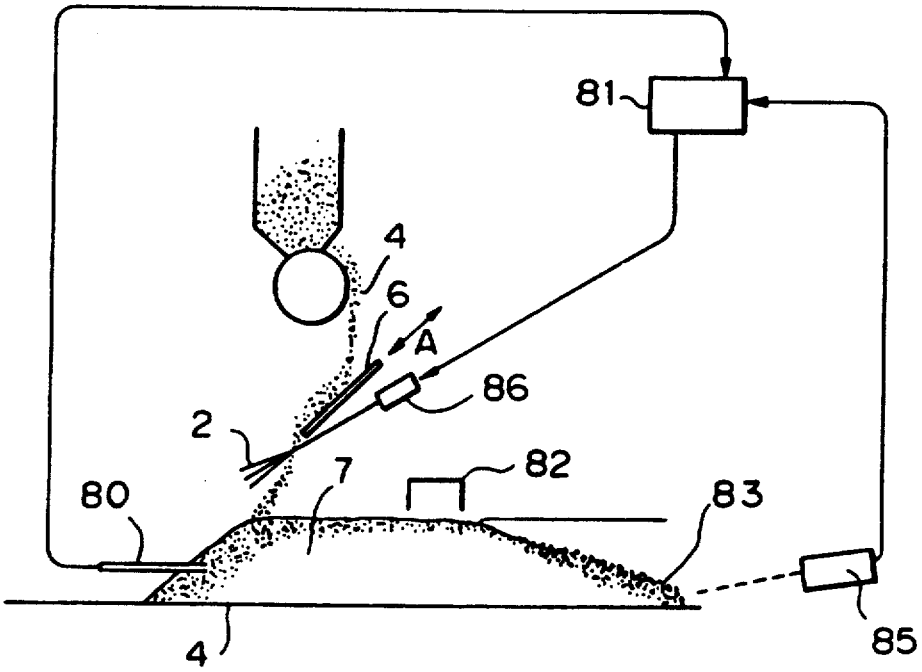
FIG. 20 is a schematic view explaining an example of the present method.

FIG. 20 is a view explaining the present method.

As explained above, a raw mix fed from a hopper falls down a chute 6. Below the chute 6, a plurality of bars 2 are provided in a downwardly sloped direction, which is opposite to the direction of advance of the pallet 1. The raw mix dispersedly falls on the pallet while being sifted so that a raw mix layer 7 is formed thereon.

In this method of the present invention, the permeability is controlled to prevent fluctuation of the sintering reaction.

As shown in FIG. 20, a $\gamma$ ray density meter 80 is inserted into the raw mix layer 7 and the bulk density of the raw mix layer measured by the density meter 80 is input to a processor 81 as electric signals. In the processor 81, the input signals are compared with a reference value and the feeding of the raw mix is controlled by changing at least one of the downward slope angles of the chute and the screen, the sliding distance of the chute, and the gap between the screen and the sintering raw mix layer, in accordance with the actually measured bulk density.

Further, since the sintering velocity is varied in accordance with the permeability of the raw mix layer, the state of the combustion zone or sintering velocity is observed so that the level of permeability of the raw mix layer is known.

After coke breeze in a surface raw mix layer is ignited by an ignition furnace, the sintering reaction proceeds downward in accordance with a downward air flow, and the result that the sintering advancing portion 85, which is gradually lowered in the discharged side of the strand, becomes a combustion zone having a high brightness. Then, an industrial camera is placed opposite to the sintering advancing portion 83 at the end of the strand.

Figure 21A:
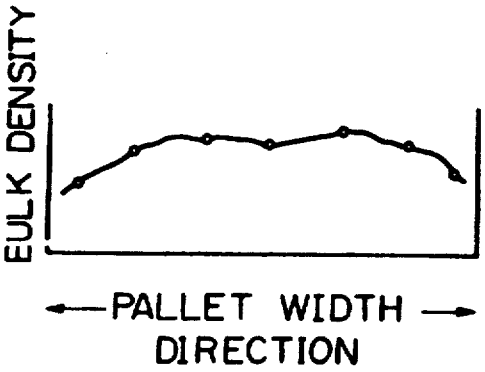
FIG. 21A is a graph of an example of the bulk density of a raw mix in the pallet width direction.
Figure 21B:
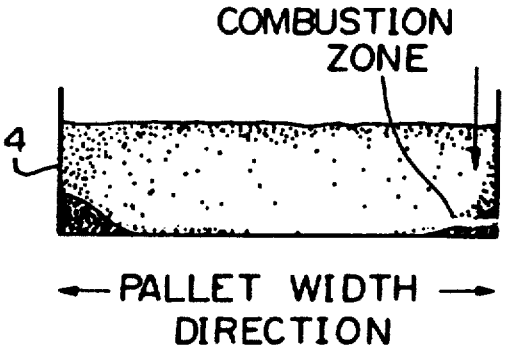
FIG. 21B is a representation of the combustion zone observed by an industrial camera.

FIG. 21B is a view of a combustion zone observed by an industrial camera. The most suitable height of the combustion zone is formed to carry out the sintering reaction with the correct amount of reaction material.

The height of the most suitable combustion zone having a high brightness is usually varied by the permeability of the raw mix. When the combustion zone is formed at a high position and the sintering raw mix positioned at a lower position than the combustion zone is undergoing a sintering reaction, if incompletely sintered raw mix is discharged, the sintering yield is lowered. On the other hand, if the combustion zone is formed at a very low position the amount of not-used air is increased, with the result that electrical power is wasted.

Conventionally, to control this process, the pallet speed is changed and thus the productivity becomes unstable.

Thus, in the present method, the area of the combustion zone and the change therein is observed, the obtained data is input to a processor as an electrical signal, and then the input signal is compared with a reference value and at least one of a downward slope angles of the chute and the screen, the sliding distance of the chute, and the gap between the screen and the sintering raw mix layer is changed so that the area of the combustion zone is controlled.

In the example of FIG. 20, a state is shown wherein data obtained by a density meter and an industrial camera is input. The state of the raw mix layer or the permeability can be detected by a means other than an industrial camera or a density meter. As a means for detecting the permeability, a differential pressure in the height direction of the raw mix layer can be measured by a differential pressure pipe inserted in the raw mix, instead of the density meter. Further, the permeability of the raw mix layer can be also detected by detecting the velocity of the air flowing in the strand advancing direction. With reference to the data obtained by such detectors, the sifting ability or dispersion ability of the bar screen is operated by the processor 81 and the obtained result input to the operating portion of a control signal. Then, with reference to the control signal, at least one of a downward slope angles of the chute and the screen, and the sliding distance of the chute is changed to control the sintering and the permeability.

The permeability of the raw mix layer can be controlled by changing the gaps between the screen and the raw mix layer. In accordance with the falling distance, the kinetic energy of the raw mix falling down on the raw mix layer is changed. This kinetic energy effects the permeability of the raw mix layer, i.e., dense or loose layer.

In addition, by controlling the positions of the bars 2 with respect to the chute 6, the filling state of the raw mix layer can be changed. The screen formed by the bars 2 is provided with a plurality of bars as explained above, the gap between the bars is larger in the top end side thereof. Accordingly, when the chute 6 is moved in the direction A as shown in FIG. 20, the gaps between the bars on which the raw mix hits are varied, and thus, by changing the raw mix screen ability, permeability is controlled. A change of a downward slope angle of a chute is also advantageously used.

Therefore, since the feeding or filling state of the raw mix on the pallet is controlled while detecting the actual state thereof, the permeability of the raw mix can be controlled so as to be at a constant level. Therefore, the height of the combustion zone can be stabilized. According to the present method, the sintering yield of 77.4% can be improved to 79.5%.

The bulk density in the width direction of the raw mix layer tends to become smaller at the wall side, and the permeability becomes larger. FIG. 21A is a view of a bulk density distribution of the raw mix layer in a width direction thereof. When, as shown in FIG. 21A, the bulk density is decreased at both side portions, the permeability thereat becomes larger, with the result that an over speed sintering reaction, i.e., an insufficient sintering, is carried out at both side portions.

In such a case, according to the present invention, the sifting or dispersion of the raw mix is controlled to become smaller at both sides of the pallet, whereby the bulk density of fed raw mix at both side portions is increased. At least one of a density meter, differential meter, industrial camera, discharged gas temperature meter, etc., are provided in the pallet width direction and the difference between the pallet center and both side portions is applied to a processor 81 as an electrical signal. Then, the processor controls at least one of the downward slope angles of the chute and the screen, the sliding distance of the chute, and the gap between the screen and the sintering raw mix layer so that the difference between the pallet center and both end side portions is eliminated and an improved sintering can be carried out. The sintering yield was improved from 73.4 to 76.1% by such control.

FIG. 21B is a view of a combustion zone observed by an industrial camera. In the example, the combustion zone is in a high position at both side portions thereof, and a raw mix positioned at a position lower than the combustion zone is discharged in the incompletely sintered state. Since the permeability is lowered, the sintering reaction is controlled by the above mentioned control, and thus the sintering reaction is the same over the whole width of the raw mix layer and the sintering yield is improved as explained above.

In the present invention, preferably bars having a good wear resistance and high strength are used. For example, steel bars plated with chromium are economically viable.

We claim:

1. An apparatus for feeding a sintering raw mix to a pallet of a sintering apparatus moving in an advancing direction, comprising:

a plurality of side-by-side bars having a longitudinal axis and sloping downwardly in the direction of falling of the sintering raw mix and which sloping direction is opposite to the advancing direction of the movement of the pallet with said bars forming a screen and the lower ends of said bars being free; and slope changing means connected to the upper ends of said bars for changing the angle of the slope of the individual bars, and drive means connected to the individual bars for rotating the individual bars around the longitudinal axes of the respective bars.

2. An apparatus as claimed in claim 1 in which the [upper] *free* ends of at least some of the respective bars are at different levels relative to each other.

3. An apparatus as claimed in claim 1 further comprising a flexible joint between each of the individual bars and said drive means.

4. An apparatus as claimed in claim 1 further comprising a frame on which the upper ends of said bars are supported, said frame being rotatably mounted for rotation around a horizontal axis transverse to the direction in which said bars extend, and means for controlling said frame for changing the angle of slope of said bars.

5. An apparatus as claimed in claim 4 in which said slope changing means comprises means on said frame for individually controlling the angle of each of said bars.

6. An apparatus as claimed in claim 4 in which said drive means comprises a drive means for each individual bar and said drive means includes said slope changing means.

7. An apparatus as claimed in claim 11 in which said slope changing means comprises a slope changing means for each individual bar, and comprises a member rotatably mounted for movement around a horizontal axis transverse to the direction in which said bars extend, and means engaged with said member for rotating said member around said horizontal axis for adjusting the angle of slope of the corresponding individual bar.

8. An apparatus as claimed in claim 11 further comprising a separable joint connected between each bar and said drive means for enabling easy replacement of the individual bars.

9. An apparatus as claimed in claim 11 in which said drive means comprises drive devices for a number of bars from a single bar to a plurality of bars less than all of the bars, said drive devices being removably mounted in said apparatus for easy replacement.

10. A method of feeding a sintering raw mix from a downwardly inclined chute onto a pallet of a sintering apparatus moving in an advancing direction comprising: pouring the sintering raw mix from the chute onto a screen of individual side-by-side bars sloping downwardly in the direction of falling of the sintering raw mix which sloping direction is the opposite of the direction of advance of the pallet and the lower ends of the bars being free and the upper ends being mounted for being individually movable to change the angle of sloping; sensing a characteristic of the layer of mix on the pallet as it undergoes sintering as a measure of the permeability of the layer; rotating the bars around their longitudinal axes; and in response to the sensed characteristic and for adjusting the permeability of the layer in the direction of a desired permeability, adjusting one of the angle of inclination of the chute, the sloping angle of the screen, the sliding distance of the chute, and the gap between the lower end of the screen and the layer of raw mix.

11. A method as claimed in claim 20, further comprising sensing the characteristic as a measure permeability across the width of the layer of raw mix on the pallet, and in response to differences in the sensed characteristic and for adjusting the permeability of the layer across the width of the layer for making it more uniform, adjusting one of the angle of inclination of the chute, the sloping angle of the screen, the sliding distance of the chute, and the gap between the lower end of the screen and the layer of raw mix.

* * * * *